H. E. FIFE.
SUPPORTING DEVICE FOR VEHICLE BODIES.
APPLICATION FILED FEB. 6, 1922.
1,418,634. Patented June 6, 1922.
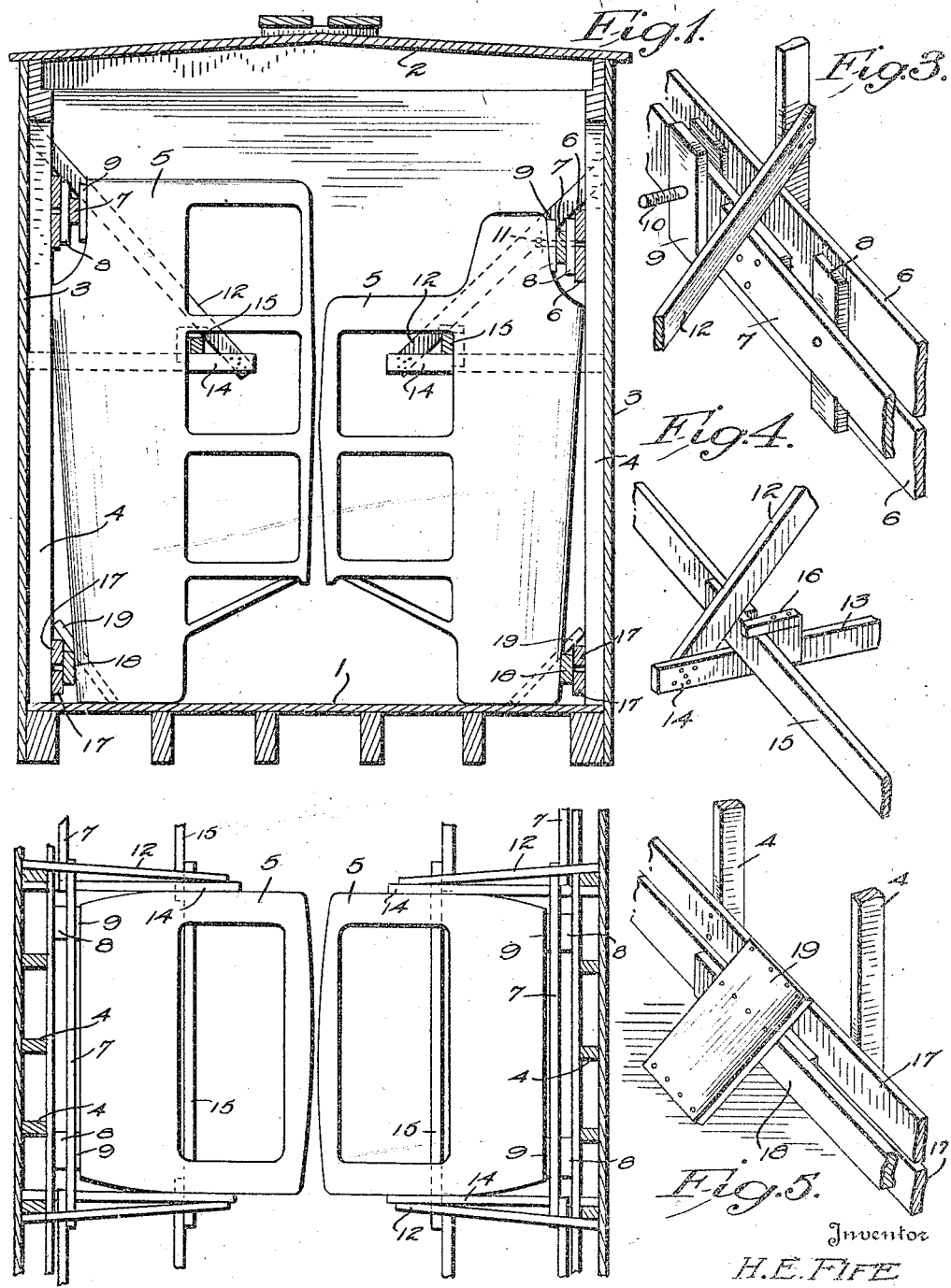
Inventor
H.E. FIFE

UNITED STATES PATENT OFFICE.

HARRY E. FIFE, OF LANSING, MICHIGAN.

SUPPORTING DEVICE FOR VEHICLE BODIES.

1,418,634.   Specification of Letters Patent.   Patented June 6, 1922.

Application filed February 6, 1922. Serial No. 534,504.

*To all whom it may concern:*

Be it known that I, HARRY E. FIFE, a citizen of the United States, residing at Lansing, in the county of Ingham and State of Michigan, have invented certain new and useful Improvements in Supporting Devices for Vehicle Bodies, of which the following is a specification.

This invention relates to supporting devices for vehicle bodies and more particularly to means for supporting the bodies of motor vehicles in freight cars to permit a greater number of bodies to be loaded in a car.

The bodies to be supported are stood on end and upper supports provided, projecting from the wall of the car and arranged on opposite sides of the body. A cross member is extended through the body between the pair of upper supports adapted to clamp the body against the side wall.

I further provide means for supporting the lower end of the body and retain it against longitudinal movement.

By providing means for supporting a vehicle body on end, in a freight car, the amount of space occupied by each body may be materially decreased and the capacity of the freight car correspondingly increased. As the manufacturers of motor vehicles hire the freight cars at a set price in shipping bodies from a body factory to the factory where the mechanical parts of the vehicle are constructed, it will be apparent that means for increasing the capacity of a freight car will materially reduce the cost of shipment for each body.

In the accompanying drawings, I have shown one embodiment of the invention. In this showing:

Figure 1 is a vertical transverse sectional view of a freight car showing the invention, Figure 2 is a horizontal plan view beneath the roof of the freight car, Figure 3 is a detail perspective view of a portion of the upper support, Figure 4 is a similar view of the remainder of the upper support, and, Figure 5 is a similar view of the lower support.

Referring to the drawings, the reference numeral 1 designates the floor of a freight car having a roof 2, and side walls 3. The side walls are provided with vertical beams 4 at intervals. The reference numeral 5 designates motor vehicle bodies arranged within the freight car and stood on end.

The supporting device forming the subject matter of the present invention consists of a plurality of horizontal strips 6 secured to the beams 4 and having similar strips 7 secured thereto and spaced therefrom by means of blocks 8. Blocks 9 are arranged on the outside of strips 7. A sufficient number of blocks 9 are employed to fill the space between the car wall and the bottom of the vehicle body when the vehicle body is in position (see Figure 1). Threaded bolts 10 are passed through these blocks and extend through the bottom of the car body. Nuts 11 are arranged on these bolts to retain the vehicle body against movement transversely of the freight car.

The upper end of the body is retained against movement longitudinally of the freight car by means of strips 12 and 13, the inner ends of which are secured to the beams 4 in any suitable manner. As shown, these strips converge and the outer ends of the strips are secured to each other, as at 14, forming a substantially V-shaped structure. A plurality of strips 15 extending longitudinally of the freight car, are mounted in the angle formed by the strips 12 and 13 and secured therein by means of a clamp 16. As shown, the strips 15 pass through the vehicle body and further retain it against movement transversely of the freight car.

At the bottom of the freight car adjacent the floor, a plurality of strips 17 are secured to the beams 4. Similar strips 18 are secured to the outer faces of the strips 17 and a sufficient number of strips 18 are employed to fill the space between the wall and the vehicle body and thus prevent movement of the body in transit. Angular strips 19 are arranged on opposite sides of the vehicle body to prevent longitudinal movement.

It has heretofore been customary to transport automobile bodies in freight cars with the bodies laid flat in the car. It will be apparent from an inspection of the drawings that the capacity of a freight car is materially limited when the bodies are packed in this manner, and that by means of the present invention, the capacity of a freight car may be materially increased. By providing blocks between the side wall of the freight car and the bottom of the vehicle body and placing the strips 15 in the position shown, the body may be locked against movement transversely of the car and prevented from becoming damaged due to jars while being transported. The upper and lower supports prevent movement of the bodies longitudinally and thus prevent them from knocking against each other and becoming scarred.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a pair of supporting members projecting from the wall of a freight car and spaced slightly greater than the width of a vehicle body to be supported, a member secured to said supporting members and passing through the car body to prevent movement thereof, and spacing members arranged between said body and the freight car wall.

2. In a device of the character described, a pair of supporting members projecting from the wall of a freight car and spaced slightly greater than the width of a vehicle body to be supported, a member secured to said supporting members and passing through the car body to prevent movement thereof, spacing members arranged between said body and the freight car wall, and lower supporting members secured to the freight car wall and spaced from each other a distance slightly greater than the width of the vehicle body.

3. In a device of the character described, a pair of supporting members projecting outwardly from the freight car wall and spaced from each other a distance slightly greater than the width of a vehicle body to be supported, each of said supporting members comprising a pair of strips arranged at an angle to each other, a longitudinally extending strip arranged between said angular strips and engaging a part of the vehicle body to be supported, and spacing blocks arranged between the body and the freight car wall.

4. In a device of the character described, a pair of supporting members projecting outwardly from the freight car wall and spaced from each other a distance slightly greater than the width of a vehicle body to be supported, each of said supporting members comprising a pair of strips arranged at an angle to each other, a longitudinally extending strip arranged between said angular strips and engaging a part of the vehicle body to be supported, clamps carried by said supporting member, and engaging said longitudinal strip, and spacing members arranged between the car body and the freight car walls.

In testimony whereof I affix my signature in presence of two witnesses.

HARRY E. FIFE.

Witnesses:
SAMUEL H. RHOADS,
ALYCE C. RHOADS.